United States Patent
Sugai

(10) Patent No.: US 6,645,076 B1
(45) Date of Patent: Nov. 11, 2003

(54) GAME APPARATUS WITH GAME PLAYER PHYSICAL STRENGTH RECOGNITION

(75) Inventor: Kazutoshi Sugai, Tokyo (JP)

(73) Assignee: Konami Computer Entertainment Tokyo, Co. Ltd., Tokyo (JP)

( * ) Notice: Subject to any disclaimer, the term of this patent is extended or adjusted under 35 U.S.C. 154(b) by 0 days.

(21) Appl. No.: 09/515,815

(22) Filed: Feb. 29, 2000

(30) Foreign Application Priority Data

Mar. 3, 1999 (JP) .......................................... 11-056232

(51) Int. Cl.[7] .............................................. G06F 19/00
(52) U.S. Cl. .............................. 463/30; 463/36; 463/37; 463/38
(58) Field of Search .............................. 463/30, 36, 37, 463/38

(56) References Cited

U.S. PATENT DOCUMENTS

| | | | | |
|---|---|---|---|---|
| 5,299,810 A | * | 4/1994 | Pierce et al. ................. | 273/442 |
| 5,669,818 A | * | 9/1997 | Thorner et al. ............... | 463/30 |
| 5,857,986 A | * | 1/1999 | Moriyasu ................. | 273/148 B |
| 5,897,437 A | * | 4/1999 | Nishiumi et al. .............. | 463/47 |
| 6,135,450 A | * | 10/2000 | Huang et al. ........... | 273/148 B |

OTHER PUBLICATIONS

Happy Puppy Review of Microsoft Combat Flight Simulator, Dec. 14, 1998, http://www.happypuppy.com/win/reviews/mscombatfl.html.*

Never Say Never Again: Film Review and Information http://00heaven.org/films/never_say_never_again.htm.*

The Bond Film Informant: Never Say Never Again http://www.mjnewton.demon.co.uk/bond/nsna.htm.*

Never Saya Never Again http://www.geocities.com/Hollywood/Bungalow/6746/nsna.html.*

Patent Abstracts of Japan Publication No. 07-185129 entitled Game Machine, By Kazufumi Ohashi, published Jul. 25, 1995.

Patent Abstracts of Japan Publication No. 09-313736 entitled Manual Operation Device for Game Machine, By Maki et al., published Dec. 9, 1997.

* cited by examiner

*Primary Examiner*—Jessica Harrison
*Assistant Examiner*—Corbett B. Coburn
(74) *Attorney, Agent, or Firm*—Bachman & LaPointe, P.C.

(57) ABSTRACT

A game apparatus includes a game apparatus body and a manual controller for entering an operation command signal from a game player into the game apparatus body. The manual controller is provided therein with a vibrating motor. The game apparatus body calculates virtual damage of a player character caused by an attack from an enemy character, and determines a vibration interval based on the calculated damage. The game apparatus body drives the vibrating motor of the manual controller according to the determined vibration interval so that the manual controller is vibrated at the determined vibration interval.

11 Claims, 9 Drawing Sheets

GAME APPARATUS WITH GAME PLAYER PHYSICAL STRENGTH RECOGNITION

BACKGROUND OF THE INVENTION

1. Field of the Invention

The present invention relates to a game apparatus which can generate vibration in a manner to cause a game player to feel the vibration, a control method for the game apparatus, and a recording medium recording therein a game program for use in the game apparatus.

2. Description of the Related Art

Game apparatus operating devices which can generate vibration have been proposed and realized. JP-A-10-295937 discloses one of those game apparatus operating devices, wherein the operating device has a grip portion to be held by a game player, and a vibrating motor is provided in the grip portion. Thus, when the vibrating motor is driven to generate vibration, the game player can feel the vibration via the grip portion.

The vibrating motor is driven by a drive command signal sent from a game apparatus body to which the operating device is connected. The drive command signal is outputted at proper timing based on a control program executed in the game apparatus body.

In the conventional techniques, for example, a drive command signal is outputted in a fishing game when a virtual fish is caught in a game space, or a drive command signal is outputted every time a player character controlled by a game player is virtually attacked by an enemy character in a game space.

However, in the foregoing conventional techniques, the drive command signal is outputted instantly responsive to the event or the motion of the player character. Specifically, no attention has been paid to a technique wherein a drive command signal is outputted in consideration of a state of a player character, for example, damage of the player character caused by attacks from an enemy character.

In the conventional techniques, information about the state of the player character is constantly displayed at a particular place in a game image not obstructing a watching point of the game player upon operating the player character, or displayed when the game player selects a particular mode. Accordingly, for learning the state of the player character, it necessary for the game player to move the watching point or select the particular mode, which may impede the operation of the player character by the game player.

SUMMARY OF THE INVENTION

Therefore, it is an object of the present invention to provide a game apparatus which can allow a game player to know a state of a player character without hindrance to command inputs by the game player for operating the player character.

It is another object of the present invention to provide a control method for a game apparatus, which can allow a game player to know a state of a player character without hindrance to command inputs by the game player for operating the player character.

It is another object of the present invention to provide a recording medium recording therein a game program which can realize the foregoing game apparatus or control method, when executed.

According to one aspect of the present invention, there is provided a game apparatus comprising operation input means for outputting an operation command signal in response to a command input from a game player; and game control means for controlling a motion of a player character according to at least one of the operation command signal and a predetermined procedure in a game space and further controlling a motion of an enemy character which attacks the player character in the game space; vibration output means for generating vibration when driven; damage deriving means for deriving damage of the player character caused by an attack from the enemy character; and driving means for determining a vibration interval based on the derived damage and driving the vibration output means according to the determined vibration interval so that the vibration output means generates the vibration at the determined vibration interval.

The operation input means is for inputting a game progressing command from a game player and for outputting an operation command signal in response to the inputted command. Preferably, the operation input means has an operating portion operable by the game player. For example, when the game apparatus of the present invention is applied to a game apparatus for business use, the operation input means may be a joystick with a tiltable lever, a control lever, push buttons, or a combination thereof. On the other hand, when the game apparatus of the present invention is applied to a game apparatus for home use, the operation input means may be an operating device, i.e. a so called manual controller, in the form of direction command keys and push buttons. The manual controller is normally detachable from a body of the home-use game apparatus or connectable to a body of the home-use game apparatus via a cable, and can be held by the game player. Further, when the game apparatus of the present invention is applied to a personal computer, the operation input means may be general-purpose input means used in a computer, such as a keyboard or a pointing device including a mouse or a track ball.

The game control means receives the operation command signal from the operation input means and controls the motion of a player character in the game space based on the received operation command signal. The game control means may execute a motion control of the player character according to the operation command signal and/or a predetermined procedure. Specifically, the game control means may execute all the motion control of the player character according to only the operation command signal or the predetermined procedure or according to both the operation command signal and the predetermined procedure. This may be fixed in the whole game or changed depending on a scene of the game.

The game realized by the game control means is applicable to a desired game, such as an action game, an adventure game, a role-playing game or a simulation game.

The vibration output means generates vibration when it is driven, and has no limitation about a structure for generating vibration. The vibration output means may be a vibrating motor with an eccentrically supported member, such as an eccentrically supported rotor, a reciprocatable weight member and an actuator for reciprocating the weight member, or an iron-core solenoid. When the vibration output means vibrates the operation input means, a proper structure of the vibration output means may be selected depending on a shape and structure of the operation input means. For example, when the operation input means is a so-called manual controller, the vibrating motor which is small but provides sufficient vibration may be selected in consideration of the maneuverability of the manual controller.

The damage deriving means derives virtual damage of the player character caused by an attack from the enemy character. A calculation manner of damage depends on a game realized by the game control means. The calculation manner may be that damage is gradually increased from a preset value upon receiving attacks from the enemy character. Damage is not necessarily changed upon every attack from the enemy character, but may be changed at random or at constant probability, or may be changed according to a positional relationship between the player character and the enemy character in the game space. Further, a changing magnitude of damage is not necessarily constant, but may be determined depending on a kind of attack from the enemy character or the foregoing positional relationship.

It may be arranged that damage derived by the damage deriving means is not only increased simply, but also restored to the foregoing preset value with a time virtually elapsing in the game space. However, if damage is restored to the preset value quickly after receiving the damage, there is not much significance in calculating the damage. Accordingly, for example, it is preferable to imitate bodily or mental damage of a human being when actually attacked by another living thing or the like.

Damage derived by the damage deriving means may also be used as a factor for determining a motion of the player character when the game control means executes a motion control of the player character. For example, when a change of damage is large, the motion of the player character may be controlled to be slow, and further, when damage exceeds a preset value, the game may be compulsorily finished.

The driving means determines the vibration interval based on the damage derived by the damage deriving means, and drives the vibration output means according to the determined vibration interval. A relationship between the damage and the vibration interval is arbitrary. It may be arranged that the vibration interval is shortened according to a change of the damage.

Since the vibration interval for the vibration output means is determined depending on the damage, the game player can learn the damage of the player character by means of the interval of vibration produced by the vibration output means. Thus, there is no hindrance to the command inputs by the game player.

It may be arranged that the damage deriving means increases the damage every time the enemy character attacks the player character, and the driving means shortens the vibration interval as the damage increases.

The fact that the vibration interval is shortened as the damage increases means that the vibration output means vibrates more frequently as the damage becomes greater. This gives a feeling of tension to the game player. Therefore, the game player can intuitively seize the damage of the player character so that there is caused no hindrance to the command inputs by the game player for operating the player character.

It may be arranged that the driving means drives the vibration output means when the damage exceeds a predetermined value. In this case, when the damage is not so large, i.e. when the damage is not greater than the predetermined value, the vibration output means does not produce vibration. Thus, the game player can more intuitively seize the damage of the player character so that there is caused no hindrance to the command inputs by the game player for operating the player character.

It may be arranged that the vibration output means vibrates the operation input means, and further, when the operation input means has a grip portion to be held by the game player upon performing the command input, the vibration output means vibrates the grip portion. When performing the command input, the game player mostly holds the grip portion. Accordingly, the game player performs the command input while feeling the vibration so that the degree of the bodily sensation can be enhanced.

It may be arranged that the damage display means is further provided for visually displaying the damage derived by the damage deriving means to the game player. In this case, the game player can learn the degree of damage based on the vibration and visually.

According to another aspect of the present invention, there is provided a control method for a game apparatus comprising operation input means for outputting an operation command signal in response to a command input from a game player; game control means for controlling a motion of a player character according to at least one of the operation command signal and a predetermined procedure in a game space and further controlling a motion of an enemy character which attacks the player character in the game space; and vibration output means for generating vibration when driven; the control method comprising the steps of: deriving damage of the player character caused by an attack from the enemy character; determining a vibration interval based on the derived damage; and driving the vibration output means according to the determined vibration interval so that the vibration output means generates the vibration at the determined vibration interval.

According to another aspect of the present invention, there is provided a recording medium recording therein a game program for use in a game apparatus comprising operation input means for outputting an operation command signal in response to a command input from a game player; game control means for controlling a motion of a player character according to at least one of the operation command signal and a predetermined procedure in a game space and further controlling a motion of an enemy character which attacks the player character in the game space; and vibration output means for generating vibration when driven; the game program, when read by the game apparatus, causing the game apparatus to execute the steps of deriving damage of the player character caused by an attack from the enemy character; determining a vibration interval based on the derived damage; and driving the vibration output means according to the determined vibration interval so that the vibration output means generates the vibration at the determined vibration interval.

BRIEF DESCRIPTION OF THE DRAWINGS

The present invention will be understood more fully from the detailed description given hereinbelow, taken in conjunction with the accompanying drawings.

In the drawings.

DESCRIPTION OF THE PREFERRED EMBODIMENT

Now, a preferred embodiment of the present invention will be described in detail with reference to the accompanying drawings.

In this embodiment, a game apparatus reads game program data from an optical disk such as a CD-ROM or the like and executes the read game program data for displaying a video game according to commands inputted from a user, i.e. a game player, as described in JP-A-8-212377. Specifically, the game apparatus has a hardware configuration as shown in FIG. 1.

Figure 1:
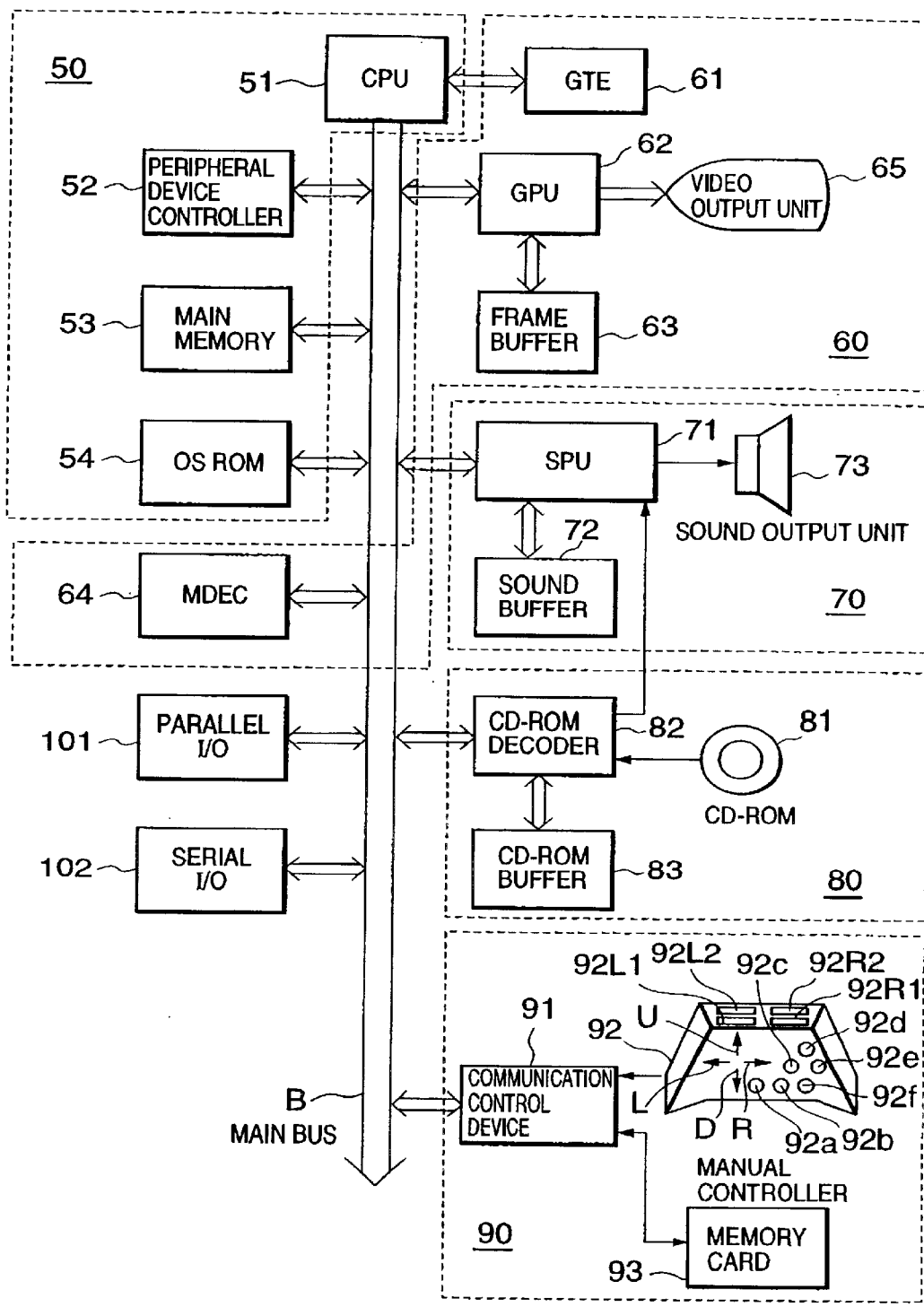
FIG. 1 is a circuit diagram showing a hardware configuration of a game apparatus according to a preferred embodiment of the present invention.

As shown in FIG. 1, the game apparatus comprises a control system 50 for controlling the game apparatus in its entirety, a graphic system 60 for handling image data, a sound system 70 for handling sound data, an optical disk controller 80 for reading data from an optical disk such as a CD-ROM and decoding the read data, a communication controller 90 for controlling user's commands and stored game settings, and a main bus B interconnecting these systems and controllers.

The control system 50 includes a main memory 53 such as a 2-Mbyte RAM for storing three-dimensional image data read from a CD-ROM. The graphic system 60 includes a frame buffer 63 for storing a color information table, texture pattern information, semitransparency ratio designating data, etc. as characteristic data designated for each of polygons of images to be displayed, and a geometry transfer engine (GTE) 61 as a coordinate transforming means for converting three-dimensional image data into two-dimensional image data through perspective transformations. The control system 50 further includes a central processing unit (CPU) 51 as a graphic command generating means for generating packetized graphic commands for respective polygons by combining the two-dimensional image data with information that specifies characteristics of the polygons. The graphic system 60 further includes a graphics processing unit (GPU) 62 for generating and storing two-dimensional image information based on characteristic data designated by the generated graphic commands into the frame buffer 63, such as a 1-Mbyte frame buffer, and a video output unit 65 such as a display unit for reading two-dimensional image information from the frame buffer 63 in synchronism with a television synchronizing signal and displaying the two-dimensional image information on its display screen.

The control system 50 further includes a peripheral device controller 52 for controlling interrupts, time control processes, and data transfer according to memory control direct memory access (DMA), and a ROM 54 such as a 512-Kbyte ROM for storing an operating system for controlling the main memory 53, the graphic system 60 and the sound system 70.

The CPU 51 is, for example, a 32-bit RISC (Reduced Instruction Set Computer) CPU and serves to control the game apparatus as a whole by executing the operating system stored in the ROM 54. The CPU 51 has a command cache memory and a scratch pad memory, and effects real-memory management.

The GTE 61 comprises a coordinate-calculating coprocessor for effecting coordinate transformations on image data stored in the main memory 53. The graphic system 60 further includes an image decoder (MDEC) 64 for decoding image data that have been compressed and encoded by orthogonal transformations such as discrete cosine transformations.

The GTE 61 has a parallel calculating function for carrying out a plurality of calculations parallel to each other. The GTE 61 serves as a coprocessor for the CPU 51 and effects at high speeds coordinate transformations such as perspective transformations, light source calculations by calculating inner products of normal vectors and light source vectors, and calculations of matrices and vectors in the fixed-point representation, in response to calculation requests from the CPU 51.

Specifically, when the GTE 61 carries out calculations for a flat shading process for displaying each triangular polygon with the same color, the GTE 61 can effect coordinate transformations for a maximum of about 1500 thousand polygons per second. The image processing system, therefore, reduces the burden on the CPU 51 and can effect coordinate transformations at high speed. Each of the polygons is a minimum graphic unit used to construct a three-dimensional object on the display screen of the display unit, and may have a polygonal shape such as a triangular shape, a quadrangular shape, or the like.

The GPU 62 operates according to polygon graphic commands from the CPU 51 to generate and store polygons, etc. into the frame buffer 63. The GPU 62 is capable of generating a maximum of about 360 thousand polygons per second. The GPU 62 has a two-dimensional address space independent of the CPU 51, and the frame buffer 63 is mapped onto the two-dimensional address space.

The frame buffer 63 comprises a so-called dual-port RAM for simultaneously transferring graphic data from the GPU 62 or data from the main memory 53, and reading data from itself for display. The frame buffer 63 has a 1-Mbyte storage capacity, for example, as described above, and stores a matrix of 1024 horizontal pixels×512 vertical pixels each of 16 bits. Data contained in any arbitrary display area of the frame buffer 63 can be outputted to the video output unit 65.

The frame buffer 63 has, in addition to the display areas for storing image data to be outputted to the video output unit 65, a CLUT area (second area) for storing a color lookup table (CLUT) to be referred to when the GPU 62 generates polygons, and a texture area (first area) for storing texture data to be mapped onto polygons that are generated by the GPU 62. The CLUT area and the texture area are dynamically variable as the display areas change. The frame buffer 63 allows image data stored in the display areas to be accessed while they are being displayed and also can transfer data in a quick DMA mode between itself and the main memory 53.

The GPU 62 is capable of effecting, in addition to the flat shading process, a Gouraud shading process for interpolating the colors of vertices of polygons into colors in the polygons, and a texture mapping process for mapping texture data stored in the texture area onto the polygons.

For carrying out the Gouraud shading process or the texture mapping process, the GTE 61 is able to effect coordinate calculations for a maximum of about 500 thousand polygons per second.

The MDEC 64 is controlled by the CPU 51 to decode image data of still images or moving images which have been read from the CD-ROM and stored in the main memory 53, and store decoded image data back into the main memory 53. Specifically, the MDEC 64 can effect inverse discrete cosine transforms (IDCTs) at high speed to expand compressed data read from the CD-ROM, the data being compressed according to a color still image compression standard (so-called "JPEG") or a moving image compression standard (so-called "MPEG", by way of intraframe compression only according to this embodiment).

The decoded image data is stored through the GPU 62 into the frame buffer 63 for use as background images for images that are generated by the GPU 62.

The sound system 70 comprises a sound processing unit (SPU) 71 for generating music sounds, effect sounds, etc. according to commands from the CPU 51, a sound buffer 72 having a storage capacity of 512 Kbytes, for example, for storing sound data such as of voices, music sounds, etc. and sound source data read from the CD-ROM, and a sound output unit 73 such as a loudspeaker for outputting music sounds, effect sounds, etc. generated by the SPU 71.

The SPU 71 has an ADPCM decoding function for decoding sound data which has been encoded as a 4-bit differential signal from 16-bit sound data by ADPCM (Adaptive Differential Pulse-Code Modulation), a reproducing function for reproducing sound source data stored in the sound buffer 72 into effect sounds, and a modulating function for modulating and reproducing sound data stored in the sound buffer 72. The SPU 71 is capable of automatically converting operation parameters with looping and time coefficients, has an ADPCM source capable of producing 24 voices, and operates under the control of the CPU 51. The SPU 71 manages an address space of its own onto which the sound buffer 72 is mapped, and transfers ADPCM data from the CPU 51 to the sound buffer 72, and directly transfers key-on/key-off and modulation information for reproducing the data.

The sound system 70 thus constructed can be used as a so-called sampling sound source for generating music sounds, effect sounds, etc. based on the data stored in the sound buffer 72.

The optical disk controller 80 comprises a disk drive 81 for reproducing a video game program and data recorded in an optical disk which typically comprises a CD-ROM, a decoder 82 for decoding the video game program and data which have been recorded together with an error correcting code, and a buffer 83 having a storage capacity of about 32 Kbytes for temporarily storing reproduced data from the disk drive 81. The optical disk controller 80 supports various disk formats including CD-DA, CD-ROM, XA, etc. The decoder 82 also serves as part of the sound system 70.

Sound data recorded on a disk played back by the disk drive 81 may be ADPCM data such as CD-ROM or XA ADPCM data, or PCM data in the form of digital sound signals converted from analog signals.

If the recorded sound data comprises ADPCM data in the form of a 4-bit differential signal encoded from 16-bit sound data, for example, then the sound data is error-corrected and decoded by the decoder 82, and the decoded sound data is supplied to the SPU 71, which converts the digital sound data into analog sound data that are supplied to the loudspeaker 73.

If the recorded sound data comprises 16-bit PCM digital data, for example, then the sound data is decoded by the decoder 82, and the decoded sound data is supplied to the SPU 71. The sound data is mixed with an output signal from the SPU 71, and the mixed sound data is transmitted through a reverberation unit which generates a final audio output signal.

The communication controller 90 comprises a communication control device 91 for controlling communication with the CPU 51 through the main bus B, a manual controller 92 for entering commands from the game player, and a memory card 93 for storing game settings and results.

The manual controller 92 serves as an interface for transmitting the will of the game player to the application, and has various keys described below. The manual controller 92 is controlled by the communication control device 91 to transmit key states about 60 times per second to the communication control device 91 according to a synchronous communication process. The communication control device 91 then transmits the key states from the manual controller 92 to the CPU 51. The manual controller 92 has two connectors and a multiple-pin tap. Therefore, a number of manual controllers 92 can be connected to the game apparatus. Commands from the game player are supplied through the manual controller 92 to the CPU 51, which effects various processing operations based on the supplied commands according to the video game program which is being executed.

The manual controller 92 has a cross key including a left key L, a right key R, an up key U and a down key D, a first left button 92L1, a second left button 92L2, a first right button 92R1, a second right button 92R2, a start button 92a, a select button 92b, a first button 92c, a second button 92d, a third button 92e, and a fourth button 92f. The cross key allows the game player to give up, down, left and right direction commands to the CPU 51. When the game player presses the start button 92a, it instructs the CPU 51 to start the video game program that is read and loaded from a CD-ROM in the disk drive 81 into the main memory 53. The select button 92b permits the game player to make and indicate various selections with respect to the video game program loaded from the CD-ROM into the main memory 53, to the CPU 51.

Figure 2:
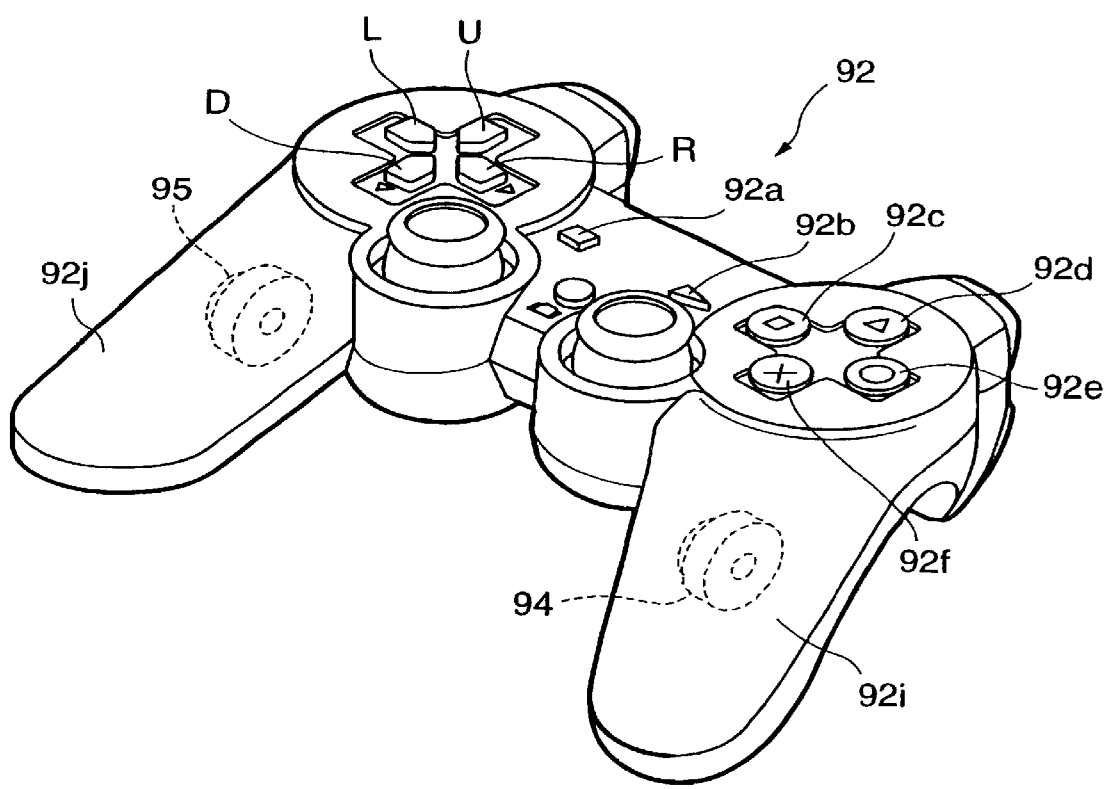
FIG. 2 is a perspective view showing a manual controller for use in the game apparatus according to the preferred embodiment of the present invention.

The foregoing manual controller 92 is illustrated in FIG. 1 by way of example only. Specifically, instead of it, a manual controller illustrated in FIG. 2 is used in this embodiment, which will be described later in detail.

When it is necessary to store settings of the game being executed or results of the game at the end of the game or while the game is in progress, the CPU 51 transmits the data of the settings or results to the communication control device 91, which stores the data into the memory card 93. The memory card 93 is connected to the communication control device 91, but not to the main bus B, and hence can be attached and detached while the game apparatus is being energized. This allows various game settings and results to be stored in a plurality of memory cards 93.

The game apparatus shown in FIG. 1 also has a 16-bit parallel input/output (I/O) port 101 connected to the main bus B, and an asynchronous serial input/output (I/O) port 102 connected to the main bus B. The parallel input/output (I/O) port 101 allows the game apparatus to be connected to peripheral devices. The serial input/output (I/O) port 102 allows the game apparatus to communicate with another game apparatus.

The main memory 53 is required to transfer a large amount of image data at high speed between itself and the GPU 62, the MDEC 64 and the decoder 82 when reading the video game program, displaying images, and generating graphic data. To meet such requirements, the game apparatus can operate in a DMA data transfer mode for directly transferring data between the main memory 53, the GPU 62, the MDEC 64 and the decoder 82 under the control of the peripheral device controller 52 rather than the CPU 51. This can reduce the burden imposed on the CPU 51 for the transfer of the data, and can transfer the data at high speed.

When the game apparatus is turned on, the CPU 51 executes the operating system stored in the ROM 54. When the operating system is executed, the CPU 51 initializes the game apparatus as a whole by confirming its operation, thereafter controls the optical disk controller 80 to read and load the video game program recorded in an optical disk such as a CD-ROM, and then executes it. When the video game program is executed, the CPU 51 controls the graphic system 60 and the sound system 70 depending on commands entered by the game player to display images and generate effect sounds and music sounds.

Displaying images on the video output unit 65 will be described hereinbelow.

The GPU 62 displays data stored in an arbitrary rectangular area of the frame buffer 63 on the display screen of the video output unit 65 such as a CRT. The rectangular area will be hereinafter referred to as a "display area". The display area may have a size selected according to a mode that has been selected. For example, when a mode 0 is selected, the display area has a size of 256 (H)×240 (V) (noninterlaced), and when a mode 9 is selected, the display area has a size of 384 (H)×480 (V) (interlaced). Therefore it is possible to designate a display start position and a display end position independently for horizontal and vertical positions on the display screen. Ranges of values that can be designated for coordinates in different modes are as follows: In modes 0 and 4, horizontal coordinates can be designated in a range from 0 to 276 (coordinates for the horizontal display start position) and in a range from 4 to 280 (coordinates for the horizontal display end position). In modes 8 and 9, horizontal coordinates can be designated in a range from 0 to 396 (coordinates for the horizontal display start position) and in a range from 4 to 400 (coordinates for the horizontal display end position). In modes 0 through 3 and 8, vertical coordinates can be designated in a range from 0 to 240 (coordinates for the vertical display start position). In modes 4 through 7 and 9, vertical coordinates can be designated in a range from 4 to 484 (coordinates for the vertical display end position). Consequently, a minimum displayed image size on the display screen is 4 horizontal pixels×2 vertical pixels (noninterlaced) or 4 pixels (interlaced).

The GPU 62 supports two modes with respect to the number of displayable colors, i.e. a 16-bit direct mode (32768 colors) and a 24-bit direct mode (full colors). The 16-bit direct mode (hereinafter referred to as a "16-bit mode") is a 32768-color display mode. In the 16-bit mode, the number of displayable colors is smaller than in the 24-bit direct mode (hereinafter referred to as a "24-bit mode"). Since the GPU 62 calculates colors with 24 bits for generating images and has a dither function for increasing the number of gradations, it can display images in a quasi-full-color (24-bit color) display mode. The 24-bit mode is a 26777216-color (full-color) display mode. In the 24-bit mode, it is only possible to display image data (bit-map data) transferred to the frame buffer 63, and the function of the GPU 62 to generate images cannot be performed. One pixel has a bit length of 24 bits. However, coordinates and display positions on the frame buffer 63 need to be specified in terms of 16 bits. Specifically, 24-bit image data of 640×480 is handled as image data of 960×480 in the frame buffer 63. It is necessary to establish coordinates for the horizontal display end position as multiples of 8. In the 24-bit mode, therefore, a minimum displayed image size on the display screen is 8 horizontal pixels×2 vertical pixels.

The GPU 62 has various graphic data generating functions as described below. The GPU 62 has a polygon or sprite generating function to generate polygons or sprites whose sizes range from 1×1 dots to 256×256 dots based on a 4-bit CLUT (4-bit mode, 16 colors/polygon, sprite), an 8-bit CLUT (8-bit mode, 256 colors/polygon, sprite), and a 16-bit CLUT (16-bit mode, 32768 colors/polygon, sprite), a polygon generating function to effect a flat shading process for generating polygons and sprites with screen coordinates specified for their vertices and coloring facets of the polygons and sprites with one color, a Gouraud shading process for specifying different colors for the respective vertices and generating gradations for facets of the polygons and sprites, and a texture mapping process for preparing and mapping texture patterns (those texture patterns for use on sprites are called sprite patterns) of two-dimensional image data onto facets of the polygons and sprites, a linear graphic data generating function to generate gradations, and an image transfer function to transfer image data from the CPU 51 to the frame buffer 63. The GPU 62 also has other functions including a function to calculate an average of pixels of an image to make the image semitransparent, an α-blending function to mix pixel data at a given ratio of α, a dither function to apply noise to boundaries of colors, a graphic clipping function not to display an area beyond a graphic display area, and an offset indicating function to move a graphic display origin depending on the graphic display area.

A coordinate system for generating graphic images is of 11 bits with signs, and has values ranging from −1024 to +1023 along each of X and Y axes. Since the frame buffer 63 has a size of 1024×512, any excess values are folded over. The origin of the coordinate system can be freely changed in the frame buffer 63 according to the offset indicating function. Graphic image data are generated and stored into an arbitrary rectangular area in the frame buffer 63 according to the graphic clipping function. The GPU 62 supports texture data of a maximum of 256×256 dots, whose horizontal and vertical values can be freely established.

Image data (texture pattern or sprite pattern) applied to polygons or sprites is stored in a non-display area of the frame buffer 63. A texture pattern or a sprite pattern comprises pages each of 256×256 pixels, and as many pages of a texture pattern or a sprite pattern as permissible by the storage capacity of the non-display area can be stored in the frame buffer 63. A storage capacity equal to 256×256 pixels in the frame buffer 63 is called a "texture page". The location of a texture page is determined by specifying a page number for a parameter in a graphic command for indicating a texture page location (address).

A texture pattern or a sprite pattern has three color modes including a 4-bit CLUT (4-bit mode), an 8-bit CLUT (8-bit mode), and a 16-bit CLUT (16-bit mode). A CLUT is used in the color modes of the 4-bit CLUT (4-bit mode) and the 8-bit CLUT (8-bit mode). The CLUT comprises 16 to 256 R, G, B values, which are three primaries representing colors that will finally be displayed, arrayed in the frame buffer 63. The R, G, B values are numbered successively from the left in the frame buffer 63. The numbers allocated to the R, G, B values represent the colors of pixels of a texture pattern or a sprite pattern. A CLUT can be selected for each of polygons or sprites, and it is possible to provide independent CLUTs for all the polygons or sprites. The position where a CLUT is stored in the frame buffer 63 is determined by specifying a coordinate of the left end of the CLUT for a parameter in a graphic command for indicating a CLUT position (address).

The GPU 62 uses a technique known as "frame double buffering" for displaying moving images. According to the frame double buffering, two rectangular areas are used in the frame buffer 63, and while graphic image data is being generated and stored into one of the rectangular areas, graphic image data from the other rectangular area is displayed, and when the storage of the graphic image data is finished, the rectangular areas are switched around to display the stored graphic image data. Therefore, the switching between the graphic image data is prevented from being displayed. The switching between the rectangular areas of the frame buffer 63 is carried out in a vertical blanking period. Since the GPU 62 can freely establish the rectangular areas for storing graphic image data and the origin of the coordinate system, it is possible to achieve a plurality of buffer areas by moving the rectangular areas and the origin of the coordinate system.

Each of graphic commands comprises a packet which may be specified directly by the CPU 51 or directly by dedicated hardware. If dedicated hardware is used to directly specify a packet, then the packet is of an arrangement which comprises a command format used by the CPU 51, the number of command words, and a tag indicative of a pointer to a next command. Such a packet arrangement allows a plurality of commands, which are not placed in contiguous areas in the frame buffer 63, to be connected and executed at once. Graphic commands of such a packet arrangement are transferred by the dedicated hardware, not the CPU 51.

Parameters included in graphic commands are as follows:

CDDE: Command code call option;

R, G, B: Luminance values shared by all vertices;

Rn, Bn, Gn: Luminance values of a vertex n;

Xn, Yn: Two-dimensional coordinates of a vertex n in a graphic space;

Un, Vn: Two-dimensional coordinates of a point in a texture source space which corresponds to a vertex n;

CBA (CLUT BASE ADDRESS): Starting address of a CLUT; and

TSB (TEXTURE SOURCE BASE): Starting address of a texture page and additional information of a texture type, etc.

For example, a triangle graphic command (command code=1h) comprises a command code including an option, followed by vertex information given as a command argument. The number of arguments and the format vary depending on the option.

Parameters include:

IIP: Type of luminance values;

SIZ: Size of rectangular areas;

CNT: Vertex used;

TME: Whether there is texture mapping or not;

ABE: Whether there is semitransparent process or not; and

TGE: Whether there is multiplication of a texture pattern and luminance values.

For example, when IIP is 0, a triangle is graphically generated (flat shading) with one type of luminance values (R, G, B). When CNT is 0, a triangle is graphically generated with three vertices following the command, and when CNT is 1, joint triangles, i.e., a quadrangle, are graphically generated with four vertices following the command. When TME is 0, the texture mapping is turned off, and when TME is 1, the texture mapping is turned on. When ABE is 0, the semitransparent process is turned off, and when ABE is 1, the semitransparent process is turned on. The parameter TGE is effective only when the parameter TME is effective. When TGE is 0, a texture pattern and luminance values are multiplied and displayed. When TGE is 1, only a texture pattern is displayed.

A straight line graphic command (command code=2h) comprises a command code including an option, followed by single-point information given as a command argument. The number of arguments and the format vary depending on the option. For example, when IIP is 0, a pixel is graphically generated with a luminance value that is specified, and when IIP is 1, luminance values of two vertices are linearly interpolated by displacing a line segment longitudinally and a pixel is graphically generated. When CNT is 0, a straight line is graphically generated with two end points following the command. When CNT is 1, joined straight lines are graphically generated. When ABE is 0, the semitransparent processing is turned off, and when ABE is 1, the semitransparent processing is turned on. When joined straight lines are to be graphically generated, a terminal end code indicative of the end of the command is required.

A sprite graphic command (command code=3h) comprises a command code including an option, followed by luminance information, a left lower end point of a rectangular area, a left upper end point of a texture source space, a width and height of the rectangular area, which are given as command arguments. The number of arguments and the format vary depending on the option. Since the sprite graphic command processes two pixels simultaneously, a two-dimensional coordinate Un of a point in the texture source space which corresponds to a vertex n has to be set to an even number.

Therefore, one low-order bit is meaningless. When TME is 0, the texture mapping is turned off, and when TME is 1, the texture mapping is turned on. When ABE is 0, the semitransparent process is turned off, and when ABE is 1, the semitransparent process is turned on. When TGE (effective only when the parameter TME is effective) is 0, a texture pattern (sprite pattern) and certain luminance values are multiplied and displayed. When TGE is 1, only a texture pattern is displayed. When SIZ is 00, the size of a rectangular area is designated by H in 2 fields. When SIZ is 01, the size of a rectangular area is designated by 1×1. When SIZ is 10, the size of a rectangular area is designated by 8×8. When SIZ is 11, the size of a rectangular area is designated by 16×16.

FIG. 2 shows a manual controller 92 which is used in this embodiment instead of the foregoing manual controller 92 shown in FIG. 1 as described before.

The manual controller 92 shown in FIG. 2 is essentially the same as a manual controller described in JP-A-10-295937 except that a vibrating motor 94 is provided in addition to a vibrating motor 95.

In FIG. 2, the manual controller 92 has at its left side a cross key including a left key L, a right key R, an up key U and a down key D, at its right side first to fourth buttons 92c to 92f, and at its center a start button 92a and a select button 92b, all of which correspond to the keys and buttons having the same reference signs in FIG. 1. The manual controller 92 is further provided with a pair of grip portions 92i and 92j projecting at one side of the manual controller 92 so as to be spaced apart from each other. The grip portions 92i and 92j are held by hands of a game player while the manual controller 92 is operated by the game player.

As described above, the vibrating motors 94 and 95 are provided within the grip portions 92i and 92j, respectively. In each of the vibrating motors 94 and 95, a rotor with coils is mounted on a drive shaft in an eccentric state. Thus, by feeding current to the coils of the rotor, the rotor rotates in the eccentric state due to interaction between itself and a ring-shaped stator magnet to produce vibration. Accordingly, vibration can be produced without providing an additional eccentric member.

Figure 3:
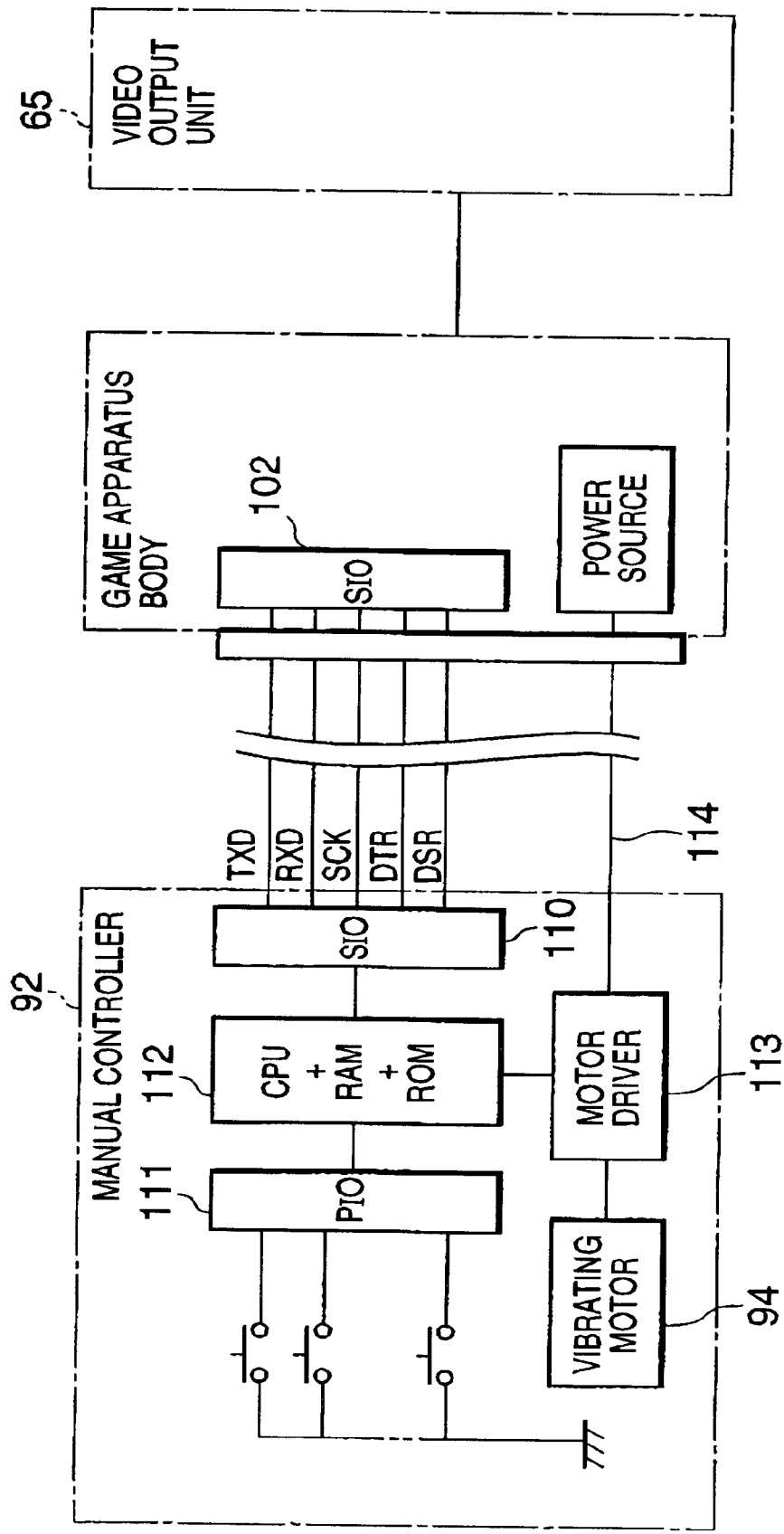
FIG. 3 is a circuit diagram showing a circuit structure of the manual controller shown in FIG. 2.

FIG. 3 shows a circuit structure of the manual controller 92 used in this embodiment. The controller 92 comprises a serial I/O interface 110 for bidirectional serial communication with the communication control device 91 of the game apparatus body, a parallel I/O interface 111 to be inputted with operation data from the foregoing keys and buttons, and a motor driver 113 for driving the vibrating motor 94. The vibrating motor 94 is driven by current supplied from the motor driver 113. Although only the vibrating motor 94 is shown in FIG. 3 for simplicity, the vibrating motor 95 and a motor driver therefor are also provided in the controller 92.

Signal lines and control lines for implementing bidirectional serial communication comprise a data transmission signal line TXD (Transmit X' Fer Data) for sending data from the game apparatus body to the controller 92, a data transmission signal line RXD (Received X' Fer Data) for sending data from the controller 92 to the game apparatus body, a serial synchronizing clock signal line SCK (Serial Clock) for picking up data from the signal lines TXD and RXD, a control line DTR (Data Terminal Ready) for establishing and interrupting communication of the controller 92 being a terminal, and a flow control line DSR (Data Set Ready) for transferring a large amount of data. All of these lines are included in a cable.

The cable also includes therein a power supply cable 114 which is connected between a power source in the game apparatus body and the motor drivers for driving the vibrating motors 94 and 95.

With the foregoing bidirectional serial communication functions, operation data inputted via the foregoing keys and buttons can be delivered from the controller 92 to the game apparatus body, and drive command signals for driving the vibrating motors 94 and 95 can be sent from the game apparatus body to the controller 92 via the data transmission signal line TXD. The drive command signals for driving the vibrating motors 94 and 95 are preset in the video game program that is read and loaded from a CD-ROM in the disk drive 81 into the main memory 53. Specifically, the game apparatus body sends a drive command signal to the controller 92 to drive the vibrating motor 94 for notifying the state of physical strength of a player character to the game player, which will be described later in detail. On the other hand, the game apparatus body sends a drive command signal to the controller 92 to drive the vibrating motor 95 for enhancing reality of the game, for example, for giving a shock to the game player when a player character is attacked by an enemy character, In this embodiment, the rotational speed of the vibrating motor 95 can be controlled, and the magnitude of vibration generated by the vibrating motor 95 is set greater than that of the vibrating motor 94. Since the driving control of the vibrating motor 95 is known, explanation thereof is omitted. Hereinbelow, explanation will be given to a driving control of the vibrating motor 94.

In this embodiment, the video game program is for performing an action game, wherein a player character operable by the game player moves in a game space imitating a particular area such as a building, and while avoiding as much as possible enemy characters attacking the player character or avoiding as much as possible receiving damage due to attacks from enemy characters by fighting off the enemy characters, the player character finds clues for the game progress which are given in the game space in advance, and finally defeats a boss enemy character (normally having the greatest attack power) to clear the game.

The foregoing clues are provided following a story called a scenario. The game player infers and presumes the development of the story and moves in the game space to find the clues. Thus, the game player can enjoy the game with a feeling that the game player goes on reading a detective story. The clues are presented to the game player in various manners. Since the presenting manners of the clues and the display manners of the clues themselves are not directly related to the features of this embodiment, detailed explanation thereof is omitted. For example, the location of a clue in the game space is clarified by a virtual map provided in the game space, and the purpose of searching for the clue is clarified in a talk with an allied character appearing in the game space.

In this action game, there are virtual objects called items in the game space. The game player controls a player character to pick up an item so that the item is virtually obtained. Since an item is virtual, it is not necessary to change a display manner of the player character immediately upon obtaining the item. When the item is obtained, a value of a preset flag in the main memory 53 corresponding to the obtained item is changed to represent that the item is obtained.

The obtained item can be equipped in an item selection mode which is executed when the game player performs a particular operation in progress of the game. The contents of a program executed for an equipping operation depend on an item. For example, when an item is a weapon such as a rifle or a knife, the player character can virtually wear the weapon by the item equipping operation, and attack an enemy character using the weapon.

Figure 8:
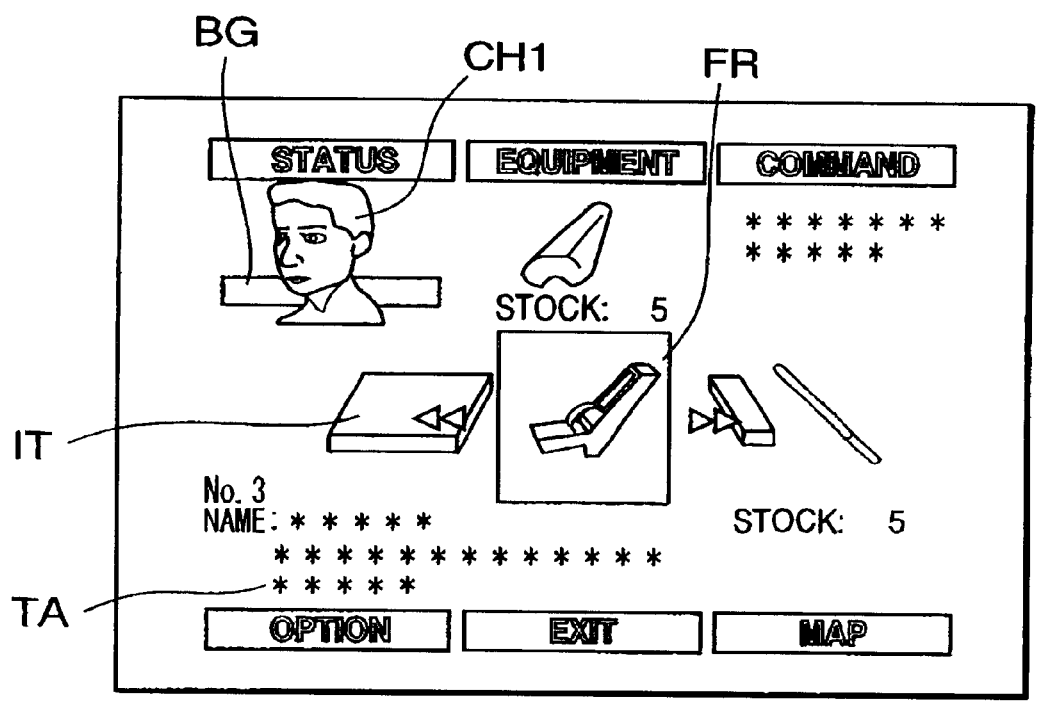
FIG. 8 is a diagram showing an item selection image of the game apparatus according to the preferred embodiment of the present invention.

When the item selection mode is executed, a game image displayed on the display screen of the video output unit 65 shifts to an item selection image as shown in FIG. 8, for example. In the item selection image, images IT corresponding to obtained items are displayed at a center portion thereof and, by operating the cross key, for example, the item images IT are scrolled in the transverse directions so that all the obtained items can be displayed. An image IT of an item which can be equipped is displayed within a frame FR displayed at the center of the item selection image. By performing a particular operation in this state, the item corresponding to the item image IT displayed within the frame FR is equipped. The item image IT corresponding to the equipped item is displayed in an equipped item display area "Equipment" at an upper center portion. In addition, a name of the item corresponding to the item image IT displayed within the frame FR and an effect achieved by equipping this item are displayed in a text display area TA under the frame FR.

In this embodiment, all objects including a player character, enemy characters, backgrounds and others arranged in the game space are constructed of polygons, and data about these polygons are recorded in the CD-ROM in the CD-ROM drive 81. For enhancing the reality of the game, the player character and the enemy characters are each constructed as an aggregate of many polygons. It is preset by the game program that enemy characters appear when a player character reaches particular positions in the game space. It differs depending on enemy characters how the enemy characters attack a player character. Simply, an enemy character attacks a player character when the player character approaches the enemy character within a predetermined distance. It may also be set that enemy characters move along predetermined routes in the game space.

Upon attacking, an enemy character performs a predetermined attack motion. A motion is expressed as data which describes along what route data of vertices of polygons constructing the enemy character move with a lapse of time. An enemy character is constructed of many polygons, and there have been proposed many techniques for describing routes along which data of vertices of these polygons move. In this embodiment, detailed explanation thereof is omitted. The attack motion is repeatedly reproduced until an enemy character is defeated by fighting with a player character or the player character moves to a position outside the foregoing predetermined distance.

In this embodiment, it is preset by the game program that a player character receives damage every time an attack of an enemy character hits the player character. A damage calculation method is arbitrary. In this embodiment, it is preset that when part of an enemy character virtually touches a player character upon attacking, the player character sustains damage. Specifically, as described above, the player character and the enemy characters are each constructed of many polygons and thus virtually occupy given volumes in the game space. Accordingly, it is judged that a touch occurs between the characters when one of polygons of the enemy character touches or crosses one of polygons of the player character, and damage is calculated. Normally, a judgment of touching or crossing between characters is called a "hit judgment". The hit judgment is not limited to touching between the characters. Specifically, for example, when an enemy character uses a virtual weapon or throws something, that normally causes damage, such as a flame, to a player character, a hit judgment may be performed between the player character and the weapon or flame. It is preset depending on a kind of an enemy character what hit judgment is performed in what situation.

In this embodiment, damage is expressed as reduction of a value of virtual physical strength of a player character. Specifically, the physical strength value of the player character upon starting the game is set to 100 points and, every time the player character sustains damage, the physical strength value is reduced by a corresponding damage amount. The damage amount is predetermined depending on a kind of attack from an enemy character. According to the game program in this embodiment, a physical strength value is processed per 1/4096 point, and thus physical strength values have 409600 (100×4096) levels. Thus, if a change of the physical strength value calculated on the game program is notified to the game player as it is, it is difficult for the game player to intuitively seize the change because the levels are so minute. Accordingly, in this embodiment, the change of the physical strength value is notified to the game player in the following manner.

Specifically, in this embodiment, when the physical strength value becomes smaller than a predetermined value, the game apparatus body sends a drive command signal to the controller 92 to drive the vibrating motor 94. While the physical strength value is within a range between the foregoing predetermined value and another predetermined value smaller than the foregoing predetermined value, the game apparatus body sends the drive command signals at a predetermined vibration interval. Then, when the physical strength value becomes smaller than the foregoing another predetermined value, the game apparatus body sends the drive command signals at another predetermined vibration interval shorter than the foregoing predetermined vibration interval. A time during which the vibrating motor 94 is driven per drive command signal is preset to a proper short time. Accordingly, the game player can seize the state of the physical strength value of the player character based on the vibration start and the vibration interval.

A relationship between the physical strength value and the vibration interval is shown in Table 1 below.

TABLE 1

| PHYSICAL STRENGTH VALUE | VIBRATION INTERVAL |
| --- | --- |
| 20 POINTS OR LESS | 0.9 SECONDS |
| 30 POINTS OR LESS | 1.2 SECONDS |
| 40 POINTS OR LESS | 1.4 SECONDS |
| 50 POINTS OR LESS | 1.6 SECONDS |
| 60 POINTS OR LESS | 2.0 SECONDS |
| GREATER THAN 60 POINTS | NO VIBRATION |

Further, in the foregoing item selection image, the change of the physical strength value is visually displayed. Specifically, as shown in FIG. 8, an image CH1 representing a player character is displayed at a left upper portion of the item selection image, and the color of a background image BG thereof is set to change depending on the physical strength value. A relationship between the physical strength value and the color of the background image BG is shown in Table 2 below.

TABLE 2

| PHYSICAL STRENGTH VALUE | BACKGROUND COLOR |
| --- | --- |
| LESS THAN 39 POINTS | RED |
| LESS THAN 65 POINTS | ORANGE |
| LESS THAN 85 POINTS | YELLOW GREEN |
| 85 POINTS OR GREATER | GREEN |

The physical strength value is recovered by "equipping" a particular item. Here, "equipping" of an item represents virtual use of an item. Kinds of items realizing the physical strength value recovery and degrees of the physical value recovery using the items are shown in Table 3 below.

TABLE 3

| ITEM | PHYSICAL STRENGTH VALUE RECOVERY EFFECT |
| --- | --- |
| NUTRITION MEDICINE | PHYSICAL STRENGTH VALUE RECOVERY OF 40 POINTS UPON USE |
| PORTABLE EMERGENCY MEDICAL KIT | PHYSICAL STRENGTH VALUE RECOVERY OF 80 POINTS UPON USE |
| AMPULE | PHYSICAL STRENGTH VALUE FULL RECOVERY (100 POINTS) UPON USE FURTHER, RECOVER OF RECEIVED DAMAGE BY 1 POINT PER SECOND FOR 5 MINUTES JUST AFTER USE |

Figure 9:
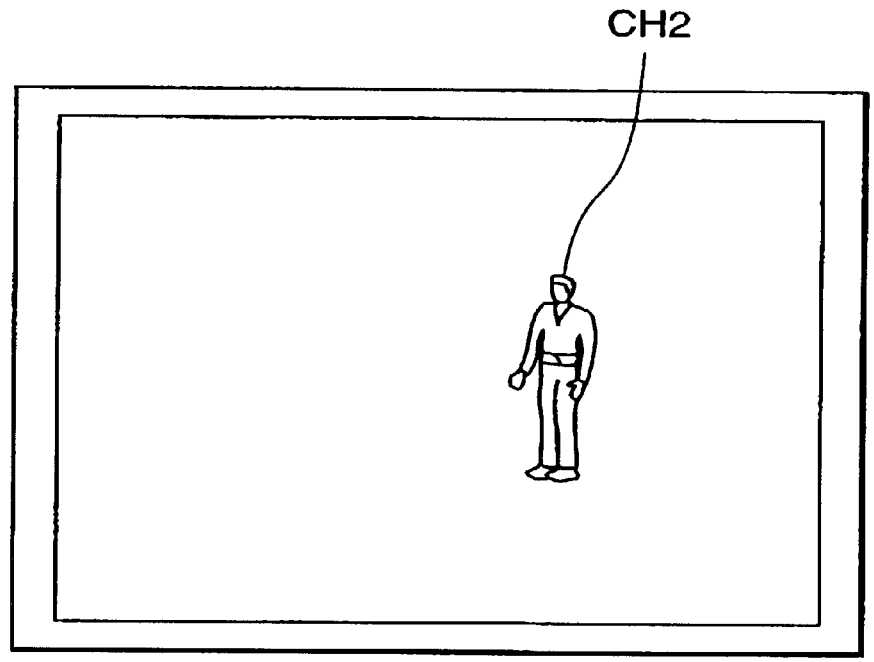
FIG. 9 is a diagram showing a game image just after a game is started.
Figure 10:
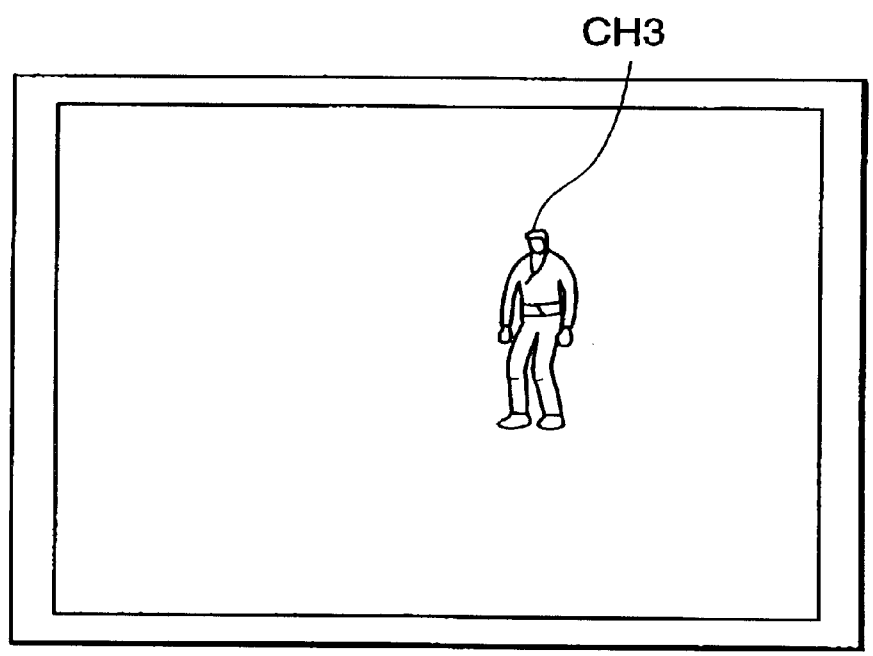
FIG. 10 is a diagram showing a game image wherein a physical strength value of a player character is lowered.

Further, the change of the physical strength value is visually displayed in a normal game image. FIG. 9 shows a game image just after starting the game, wherein an image CH2 representing the player character is displayed. FIG. 10 shows a game image in the state where the physical strength value of the player character is largely reduced, wherein an image CH3 of the player character is displayed. As appreciated from comparison between the character images CH2 and CH3 shown in FIGS. 9 and 10, in the character image CH3, the player character takes a posture with lowered shoulders which an actual human being takes upon being tired.

Figure 7:
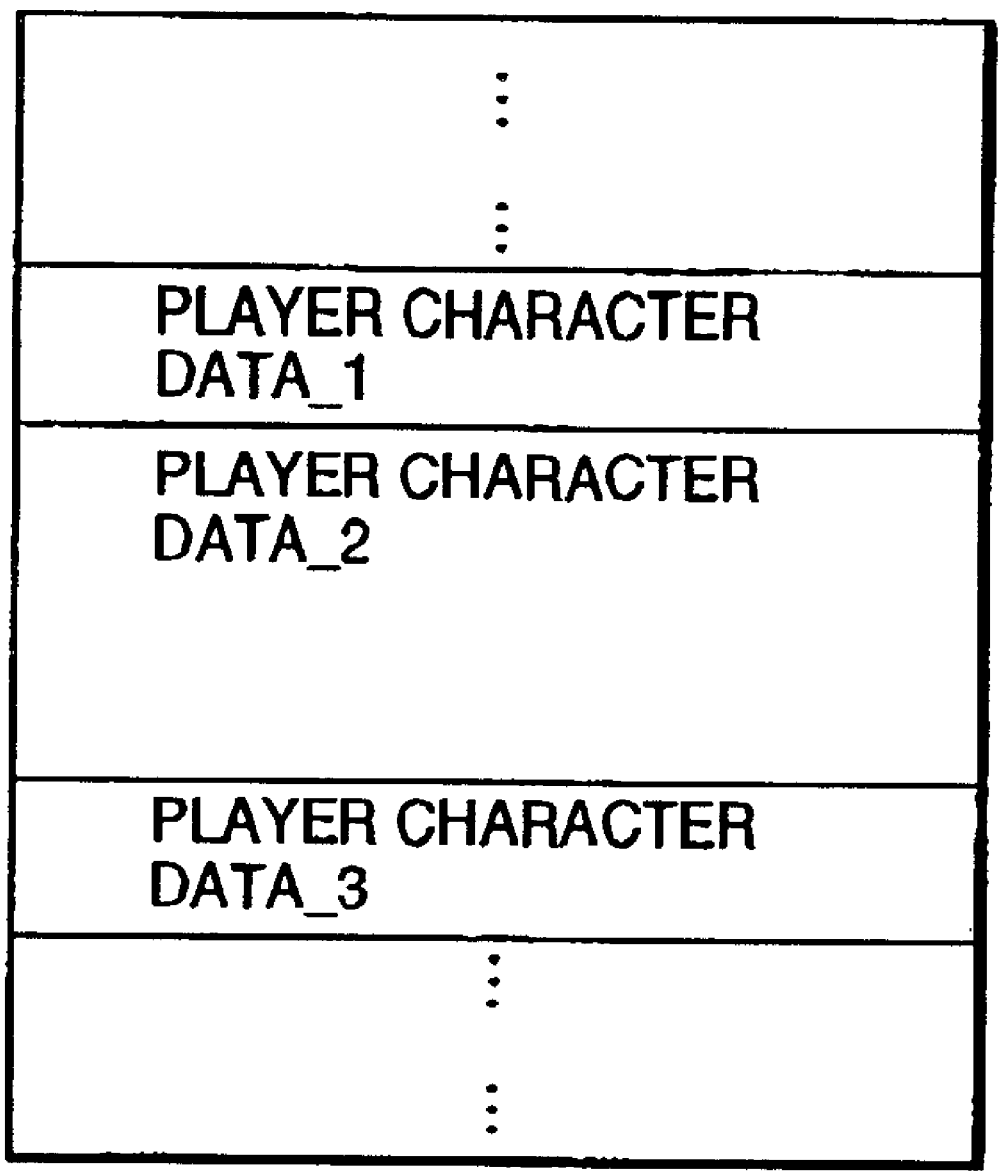
FIG. 7 is a diagram showing the state wherein character pattern data are stored according to the preferred embodiment of the present invention.

As described before, the character images CH2 and CH3 are actually displayed using many polygons and texture data mapped thereon. Accordingly, the posture of the player character can be changed by changing coordinates of vertices of the polygons. In this embodiment, as shown in FIG. 7, the game program includes pattern data (player character data_1 to 3 in FIG. 7) of a plurality of postures corresponding to the physical strength value ranges, selects one of the pattern data depending on a change of the physical strength value, i.e. corresponding to the physical strength value range, and generates the character image CH2 or CH3 using the selected pattern data. In this embodiment, the pattern data relates to a normal posture in the state wherein no operation command for the player character is inputted from the game player as seen from FIGS. 9 and 10, and comprises coordinates of vertices of many polygons constructing the player character. When an operation command is inputted from the game player, a character image is generated using the selected pattern data such that the player character acts based on the operation command inputted from the game player. The pattern data storing, the data structure and the character image generation based on the pattern data are known, so that detailed explanation thereof is omitted.

Figure 4:
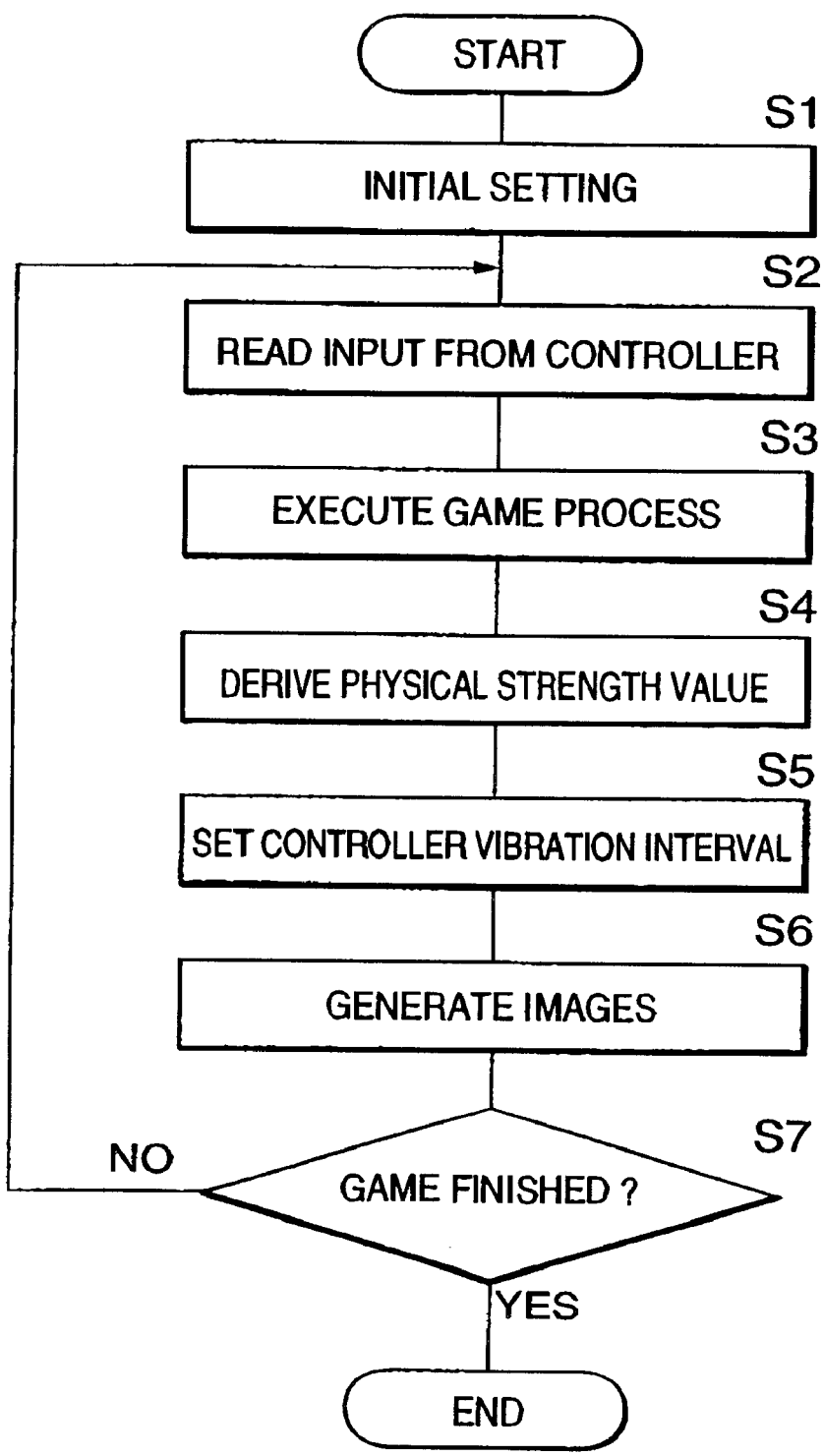
FIG. 4 is a flowchart for explaining the overall operation of the game apparatus according to the preferred embodiment of the present invention.
Figure 5:
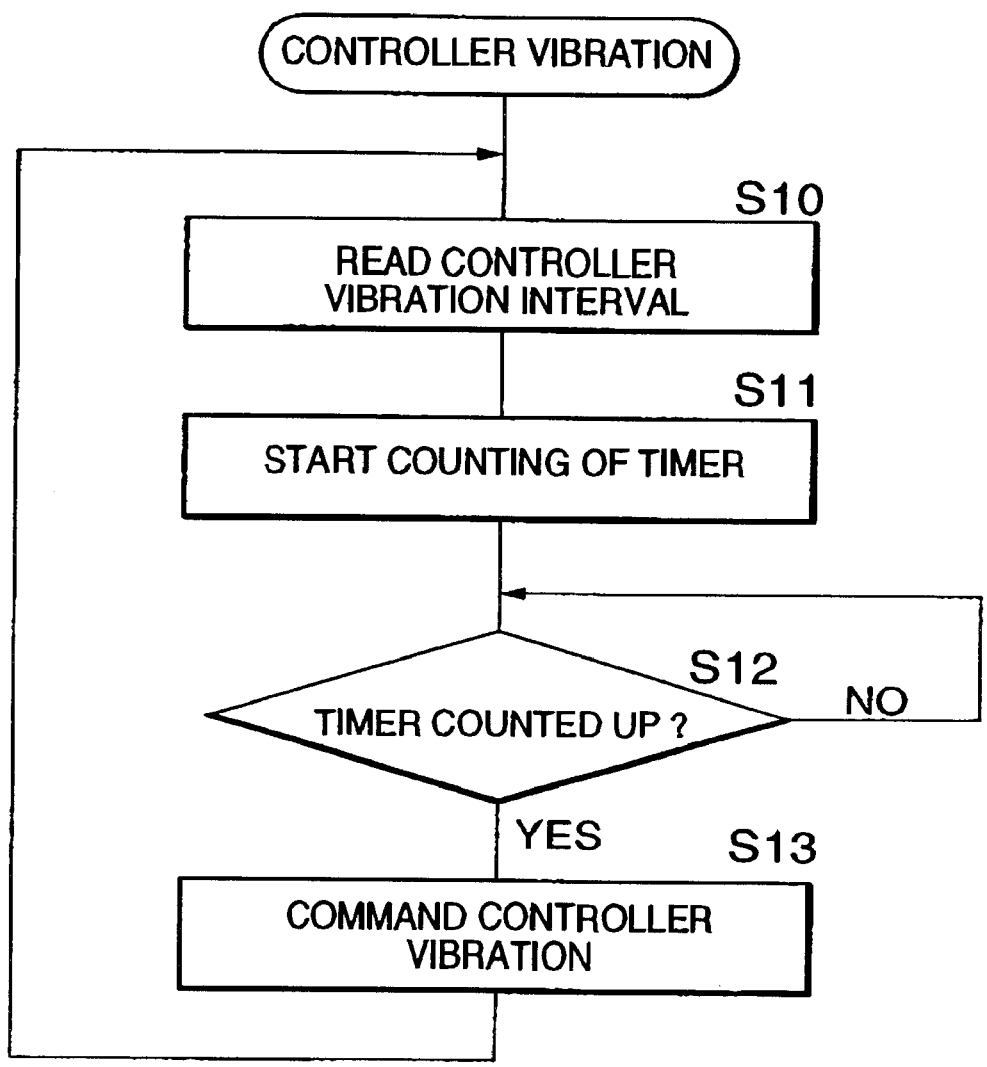
FIG. 5 is a flowchart for explaining a controller vibrating operation of the game apparatus according to the preferred embodiment of the present invention.
Figure 6:
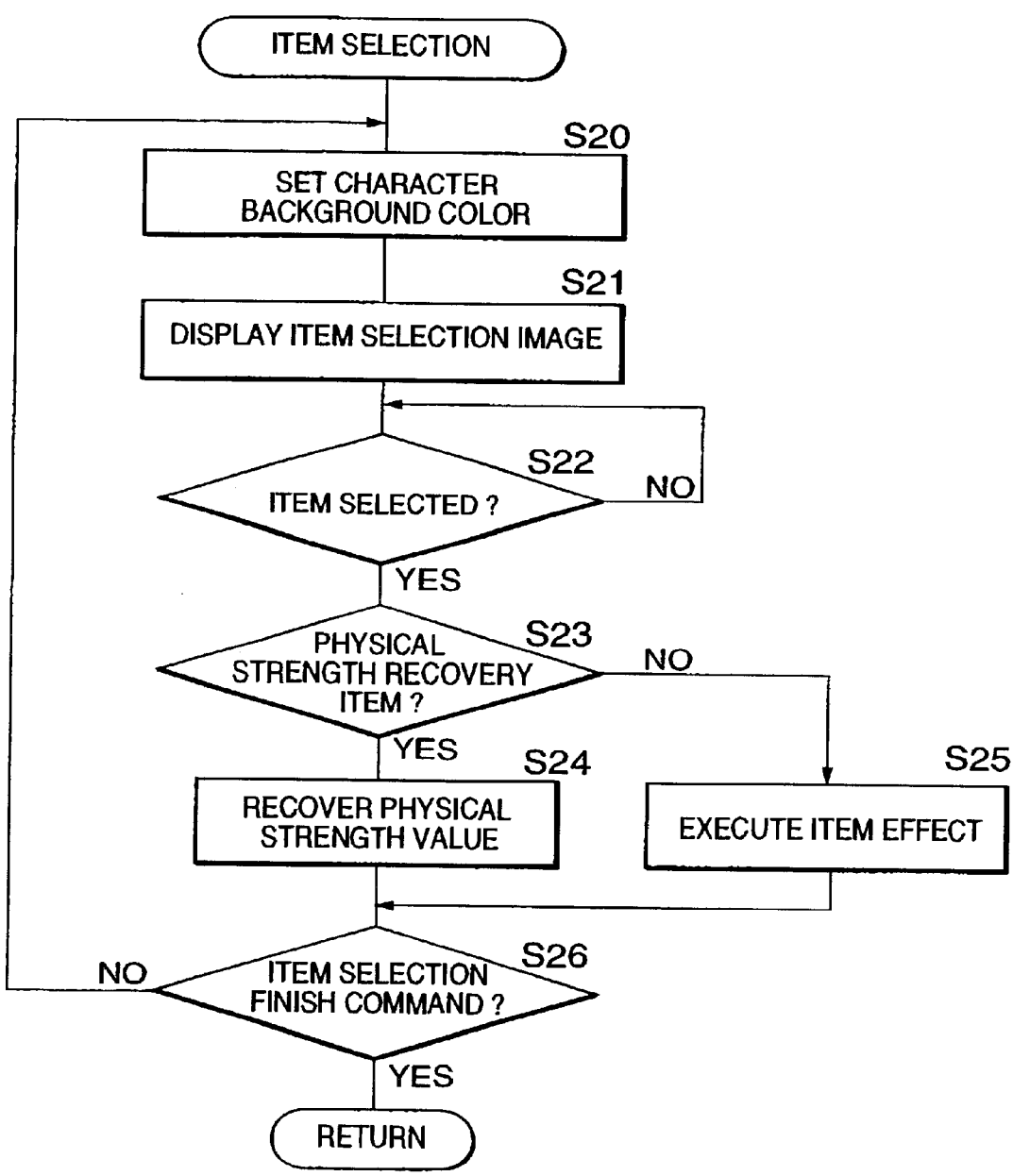
FIG. 6 is a flowchart for explaining an item selection mode operation of the game apparatus according to the preferred embodiment of the present invention.

FIGS. 4 to 6 are flowcharts for explaining operations of the game apparatus in this embodiment. When the game apparatus is turned on, the CPU 51 executes the operating system stored in the ROM 54. When the operating system is executed, the CPU 51 initializes the game apparatus as a whole by confirming its operation, and thereafter controls the optical disk controller 80 to read the video game program from the CD-ROM in the CD-ROM drive 81 and load it into the main memory 53. The operations of the game apparatus represented by the flowcharts shown in FIGS. 4 to 6 are realized when the CPU 51 executes the video game program stored in the main memory 53.

FIG. 4 is a flowchart for explaining the overall operation of the game apparatus in this embodiment.

Step S1 implements the initial setting of the game. The contents of the initial setting are known. For example, the initial setting includes whether the memory card 93 is loaded, whether there exists data representing a history of the game, i.e. saved data, when the memory card 93 is loaded, and whether to read the saved data into the game apparatus.

Step S2 reads operation command inputs given from the controller 92 through an operation of the keys and buttons thereof by the game player.

Step S3 executes a game process based on the operation command inputs and a predetermined procedure. The game process includes movement, posture selection and motion of a player character based on the operation command inputs, a change of a background image following the movement of the player character, appearance of an enemy character or not, motion of the enemy character if it appears, appearance of an item or not, and others. The foregoing hit judgment is also included in the game process.

Step S4 calculates a physical strength value of the player character based on a result of the hit judgment performed in the game process.

Step S5 determines a vibration interval for the vibrating motor 94 of the controller 92 according to the relationship shown in Table 1 based on the physical strength value of the player character derived at step S4.

Step S6 generates images of the player character, the enemy character and the background based on a result of the game process executed at step S3. Details of the image generation are as described before.

Step S7 judges whether a condition to compulsorily finish the game has been satisfied as a result of the game process at step S3. If positive, the routine shown in the flowchart of FIG. 4 is finished. If negative, the routine returns to step S2 to repeat the foregoing processes. The condition to compulsorily finish the game includes a case wherein the physical strength value of the player character becomes 0 (zero) point. Thus, the game player always watches the physical strength value of the player character, so that when the physical strength value is reduced so much, the game player uses the items shown in Table 3, or avoids attacks from the enemy character.

FIG. 5 is a flowchart for explaining an operation of driving the vibrating motor 94 of the controller 92 in the game apparatus according to this embodiment. The routine shown in the flowchart of FIG. 5 is constantly executed while the routine shown in the flowchart of FIG. 4 is executed.

Step S10 reads the vibration interval for the vibrating motor 94 of the controller 92 set at step S5 in FIG. 4 and sets it in a timer. The timer is realized in a software fashion by the video game program of the game apparatus in this embodiment.

Step S11 starts counting of the timer. If the timer is counted up at step S12, the routine proceeds to step S13.

Step S13 sends to the controller 92 a command signal for driving the vibrating motor 94 of the controller 92 for a predetermined time. Then, the routine returns to step S10 to repeat the foregoing processes. Thus, the vibrating motor 94 of the controller 92 is driven according to the vibration interval set at step S5 in FIG. 4, so that vibration is produced at the vibration interval set at step S5.

FIG. 6 is a flowchart for explaining an operation of the item selection mode executed in the game apparatus of this embodiment. The routine shown in the flowchart of FIG. 6 is executed by way of interrupt when the game player performs the particular operation while the processes at steps S2 to S6 in FIG. 4 are executed.

Step S20 sets a color of the background image BG of the player character according to the relationship shown in Table 2 based on the physical strength value of the player character derived at step S4 in FIG. 4.

Step S21 generates an item selection image as shown in FIG. 8 using the color of the background image BG set at step S20.

Step S22 judges whether an item is selected by the game player. If positive, the routine proceeds to step S23 which judges whether the selected item is one of the physical strength recovery items shown in Table 3. If positive, the routine proceeds to step S24. If negative, the routine proceeds to step S25.

Step S24 recovers the physical strength value of the player character according to the relationship shown in Table 3.

Step S25 realizes an effect allocated to the selected item.

Step S26 judges whether a command for finishing the item selection is inputted from the game player. If positive, the routine shown in FIG. 6 is finished and the processes at steps S2 to S6 shown in FIG. 4 are again executed. On the other hand, if negative, the routine returns to step S20 to repeat the foregoing processes.

As described above, according to this embodiment, the vibrating motor 94 of the controller 92 is driven based on the physical strength value of the player character to vibrate the controller 92, so that the game player can understand the change of the physical strength value based on the interval of the vibration of the controller 92. Thus, the game player can learn the change of the physical strength value by the touch or the feel without hindrance to command inputs for operating the player character. This is particularly convenient in that the game player can learn the change of the physical strength value of the player character without turning his/her eyes away from the game image in a tense situation where the player character is attacked by an enemy character.

Further, according to this embodiment, the physical strength value of the player character is visually displayed using the color of the background image BG of the player character in the item selection image. Thus, the game player can intuitively seize the change of the physical strength value of the player character. Normally, the player character is not attacked by an enemy character in the item selection image so that the game player can concentrate upon item selection. Therefore, even if the change of the physical strength value of the player character is visually displayed, no problem is actually raised. Further, the items include the physical strength recovery items, and the color of the background image BG of the player character is changed upon using arbitrary one of these physical strength recovery items. Thus, the game player can immediately confirm the degree of the physical strength recovery visually.

While the present invention has been described in terms of the preferred embodiment, the invention is not to be limited thereto, but can be embodied in various ways without departing from the principle of the invention as defined in the appended claims.

What is claimed is:

1. A game apparatus comprising:
    operation input means for inputting a command from a game player and outputting an operation command signal in response to the command;
    game control means for controlling a motion of a player character according to at least one of the operation command signal and a predetermined procedure in a game space and further controlling a motion of an enemy character which attacks said player character in the game space;
    vibration output means for generating vibration when driven;
    damage deriving means for deriving damage of said player character caused by an attack from said enemy character; and
    driving means for determining a vibration interval based on a physical strength value of the player character, wherein the physical strength value repeatedly changes over time in response to the derived damage, and when the physical strength is changed, the driving means determines a changed vibration interval based on the changed physical strength, and said driving means further driving said vibration output means according to the changed vibration interval so that said vibration output means generates the vibration at the changed vibration interval.

2. The game apparatus according to claim 1, wherein said driving means shortens the vibration interval as the physical strength value decreases.

3. The game apparatus according to claim 2, wherein said driving means drives said vibration output means when the physical strength value falls below a predetermined value.

4. The game apparatus according to claim 1, wherein said vibration output means vibrates said operation input means.

5. The game apparatus according to claim 4, wherein said operation input means comprises a grip portion to be held by the game player upon performing the command input, and said vibration output means vibrates said grip portion.

6. A control method for a game apparatus comprising:
    operation input means for inputting a command from a game player and outputting an operation command signal in response to the command;
    game control means for controlling a motion of a player character according to at least one of the operation command signal and a predetermined procedure in a game space and further controlling a motion of an enemy character which attacks said player character in the game space; and
    vibration output means for generating vibration when driven;
    said control method comprising the steps of:
        deriving damage of said player character caused by an attack from said enemy character;
        determining a vibration interval based on a physical strength value of the player character, wherein the physical strength value repeatedly changes over time in response to the derived damage, and when the physical strength is changed, the driving means determines a changed vibration interval based on the changed physical strength; and
        driving said vibration output means according to the changed vibration interval so that said vibration output means generates the vibration at the changed vibration interval.

7. The control method according to claim 6, wherein the vibration interval determining step comprising shortening the vibration interval as the physical strength value decreases.

8. The control method according to claim 7, wherein said driving step comprises driving said vibration output means when the physical strength value falls a predetermined value.

9. A recording medium recording therein a game program for use in a game apparatus comprising:
    operation input means for inputting a command from a game player and outputting an operation command signal in response to the command;
    game control means for controlling a motion of a player character according to at least one of the operation command signal and a predetermined procedure in a game space and further controlling a motion of an enemy character which attacks said player character in the game space; and
    vibration output means for generating vibration when driven;
    said game program, when read by said game apparatus, causing said game apparatus to execute the steps of:
        deriving damage of said player character caused by an attack from said enemy character;
        determining a vibration interval based on a physical strength value of the player character, wherein the physical strength value repeatedly changes over time in response to the derived damage, and when the physical strength is changed, the driving means determines a changed vibration interval based on the changed physical strength; and
        driving said vibration output means according to the changed vibration interval so that said vibration output means generates the vibration at the changed vibration interval.

10. The recording medium according to claim 9, wherein the vibration interval determining step comprising shortening the vibration interval as the physical strength value decreases.

11. The recording medium according to claim 10, wherein the driving step comprises driving said vibration output means when the physical strength value falls a predetermined value.

* * * * *